Nov. 5, 1935.  L. C. HESTER  2,019,854
CULTIVATOR ATTACHMENT FOR TRACTORS
Filed Feb. 6, 1935  2 Sheets-Sheet 2
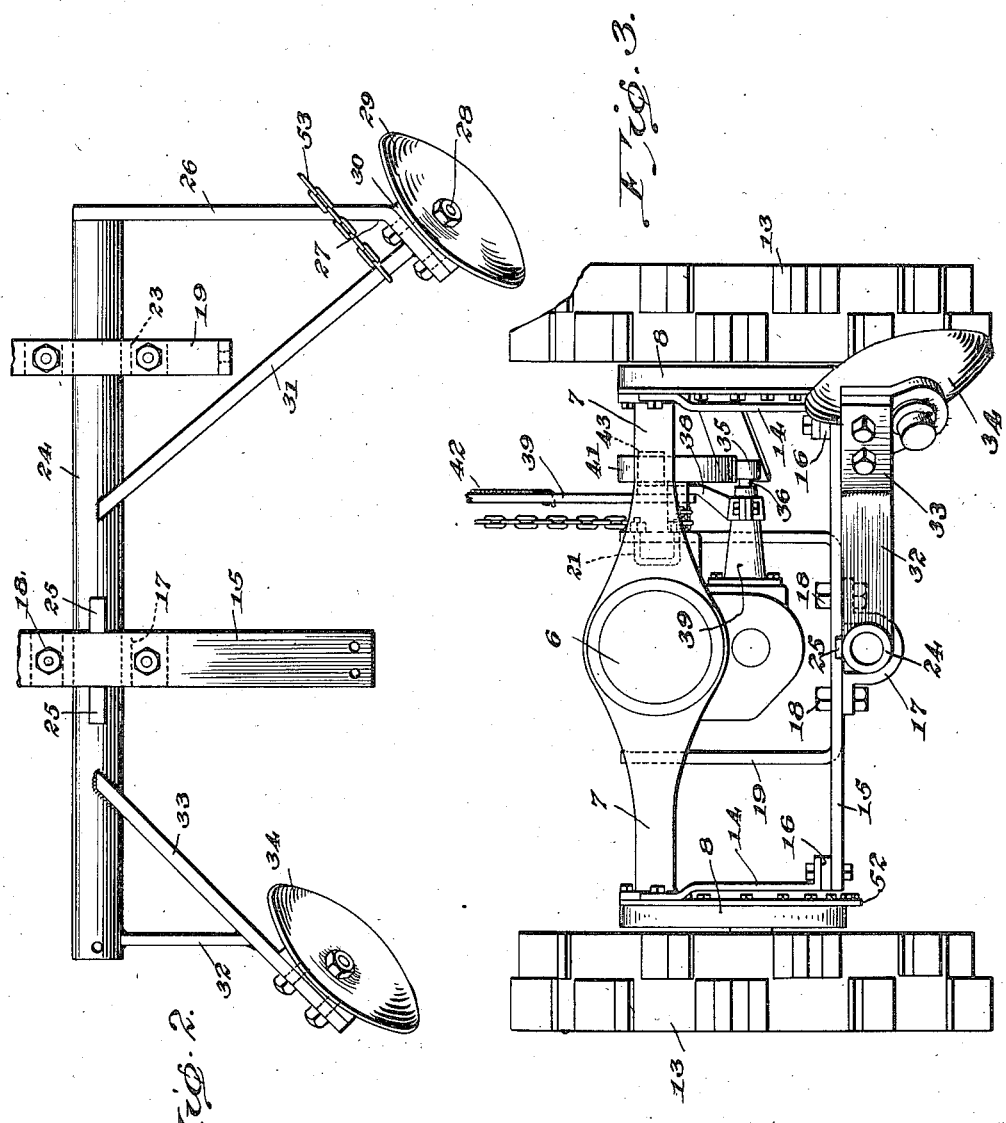
Inventor
Levi C. Hester,
By Munn, Anderson & Liddy
Attorneys Patented Nov. 5, 1935

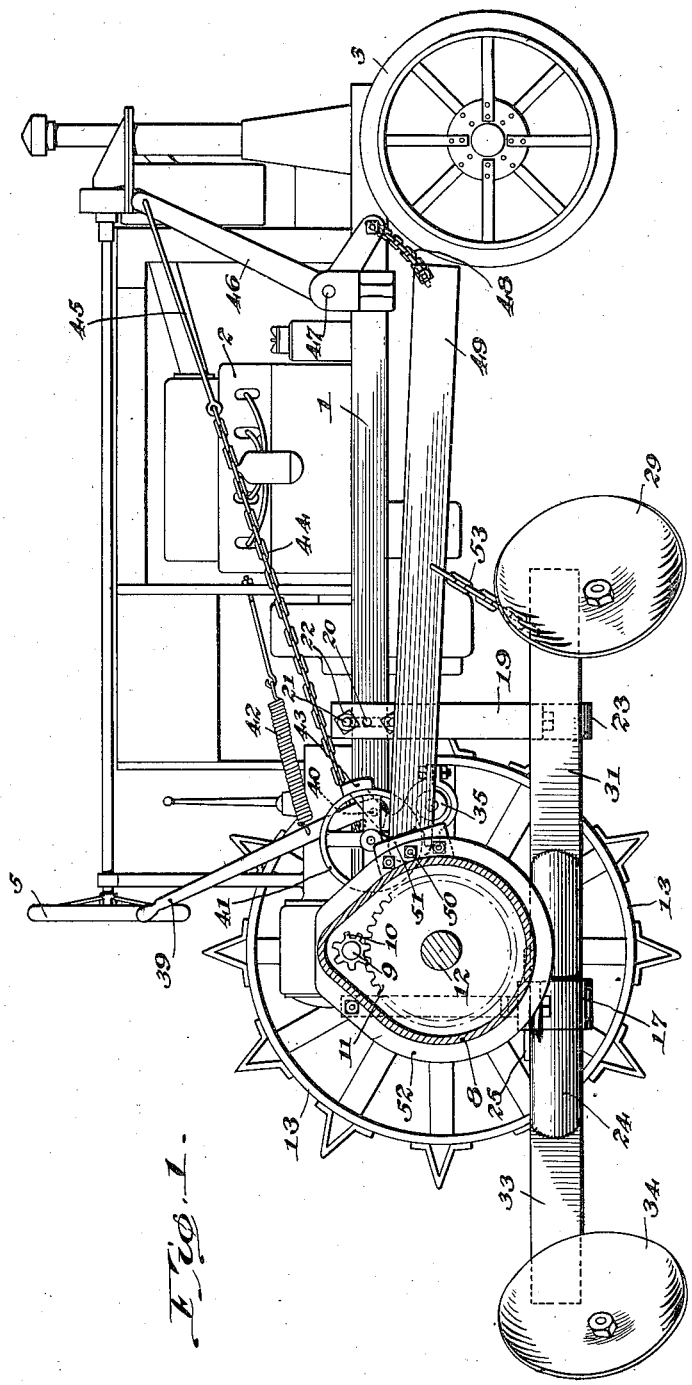

2,019,854

UNITED STATES PATENT OFFICE 2,019,854

CULTIVATOR ATTACHMENT FOR TRACTORS

Levi C. Hester, Jacksonville, Fla.

Application February 6, 1935, Serial No. 5,291

4 Claims. (Cl. 97—47)

My invention relates to improvements in cultivator attachments for tractors, and it consists in the combinations, constructions and arrangements herein described and claimed.

An object of my invention is to provide an attachment whereby cultivator disks may be disposed in operative arrangement at one side of a tractor, but attached in the central longitudinal axis of the tractor thereby facilitating the guidance and preventing the undue deviation of the tractor from the normal line of travel.

A further object is to provide means for lifting the cultivator discs so as to permit the tractor to be moved easily from place to place.

A further object of the invention is to provide an arrangement in which the disks are disposed on one side of the central longitudinal axis, but in such a manner that when the cultivating is done there will be no tractor wheel marks and the field will be left in smooth condition.

A further object is to provide a device in which one disk precedes the wheel, thereby leaving a smooth furrow in which the wheel can travel and another disk covers up the track made by the wheel.

Other objects and advantages will appear in the following specification and the novel features of the invention will be particularly pointed out in the appended claims.

My invention is illustrated in the accompanying drawings forming part of this application in which:

Figure 1 is a side view of the device, one wheel being removed and a portion of the gear housing being shown in section.

Figure 2 is a plan view of a pivot shaft and the cultivator disks supported thereby, and, Figure 3 is a rear view of a portion of the device.

In carrying out my invention I make use of a tractor of any standard construction. Thus in Fig. 1 the frame of the tractor is indicated at 1, the motor at 2, the front wheels at 3, the drive wheels at 13 and a steering mechanism at 5. The differential housing 6 is extended on both sides, as shown at 7—see Fig. 3—and at the end of each extension is secured a gear housing 8. In the present instance a shaft 9—see Fig. 1— passes through each housing 7 and terminates in a pinion 10 which engages a gear 11 on a stub shaft 12. Each stub shaft bears a tractor wheel 13.

As will be seen from Fig. 3, brackets 14 are secured to the inner sides of the drums or housings 8. A cross bar 15 is adjustably secured to these brackets, the spacing members 16 being provided to locate the bar 15 in the proper position. A U-shaped bearing member 17 is secured to the underside of the bar 15 by means of bolts 18— see Fig. 3.

Disposed forwardly of the bar 15 is a U-shaped suspending member 19. The upper ends of this U-shaped suspending member are provided with openings 20—see Fig. 1—and through these openings U-shaped bolts 21 extend and are provided with nuts 22 for clamping the ends of the U-shaped suspending member to the frame 1 in adjusted positions. The suspending member 19 is provided with a bearing 23 similar to the bearing 17, these bearings being in alinement as shown in Fig. 1.

A pivot shaft 24 is mounted in the bearings 17 and 23. It is provided with lugs 25 on each side of the bar 15 to prevent longitudinal movement of the pivot rod along its axis. Secured to the pivot rod is a laterally extending arm 26 which is provided with a stub shaft 28, upon which is mounted a cultivator disk 29, a spacing member 30 being disposed immediately behind the disk, and having a contour conforming with that of the disk. A brace member 31 extends from the bearing to the pivot rod 24, being firmly secured thereto by welding or in any other suitable manner. At the opposite end of the pivot rod is an arm 32 which extends forwardly to a brace member 33, on which is pivotally mounted a cultivator disk 34. It will be noted that the disk 29 extends further from the pivot rod than the disk 34.

Referring again to Fig. 3 it will be seen that there is a small friction wheel 35 disposed on a shaft 36 passing through a housing 37, and which is connected with the driving mechanism within the differential housing in any well known manner. Mounted on the housing 37 is a bracket 38. A bell crank lever 39 is pivotally mounted at 40—see Fig. 1—on this bracket, one end of this bell crank lever having a pivotally mounted friction wheel 41. A spring 42 which is attached to the lever 39 normally holds the wheel 41 against a brake block 43. When however, the lever 39 is pulled rearwardly then the wheel 41 will be swung away from the brake block and down into contact with the friction wheel 35, thereby imparting a rotary motion to the wheel 41.

The shaft of the latter is prolonged and has a chain 44 wound thereon. This chain is attached to a link 45 connected with a bell crank lever 46, which is pivoted at 47 and the opposite end of which is connected by a chain 48 with a beam 49. The beam 49 is pivotally connected at its opposite end at 50 to a plate 51, which is fastened to the flange of one of the gear drums 8, this flange being shown at 52. A chain 53 is connected at one end to the beam 49 and at the other end to the frame which holds the cultivator disks.

From the foregoing description of the various parts of the device the operation thereof may be readily understood. The cultivator disk 29 is located in front of the rear right-hand tractor wheel 13 in the present instance, so that the furrow made by this cultivator disk forms a path for the travel of the tractor wheel. The rear disk 34, as will be seen from Fig. 3, is disposed in such a position as to throw the dirt outwardly to cover the track of the wheel.

The construction is such that the line of draft is in the central longitudinal axis of the tractor, and therefore there is very little tendency for the tractor to be swung around out of its normal position of travel even though the cultivator disks are at one side thereof.

When it is desired to elevate the cultivator disks so as to permit the tractor to move freely from the field to the house, or vice versa, the lever 39 is grasped and pulled rearwardly. This will result in bringing the wheel 41 into contact with the wheel 35 and the winding up of the chain 44 and the lifting of the two disks by the raising of the beam 49 and the swinging of the frame carrying the disks on the pivot rod 24. When the lever 39 is released the wheel 49 is brought back against the brake block 40, which holds the disks in their elevated position. When it is desired to lower the disks the lever 39 is moved just far enough to bring the wheel 41 away from the block 43, but not far enough to bring it into engagement with the wheel 35 and the weight of the mechanism will cause the disks to return to their normal position.

It will be observed that this lever may be also a means of regulating the depth of the cut, since the power means may raise the plows as far as desired. The depth of the cut may also be regulated by the suspending members 15 and 19, as already described.

I claim:

1. The combination with a tractor having drive wheels, of a frame pivotally mounted on the central longitudinal axis of the tractor, a cultivator disk carried by said frame in frone of one of said tractor wheels, and a cultivator disk carried by the frame rearwardly of said tractor wheel in a position to throw the dirt into the track left by the tractor wheel.

2. The combination with a tractor having drive wheels, of a frame pivotally mounted on the central longitudinal axis of the tractor, a cultivator disk carried by said frame in front of one of said tractor wheels, a cultivator disk carried by the frame rearwardly of said tractor wheel in a position to throw the dirt into the track left by the tractor wheel, and manually actuated means for applying the engine power of the tractor to raise the disks simultaneously.

3. The combination with a tractor having drive wheels, of a pivot rod rotatably disposed along the central longitudinal axis of the tractor, a cultivator disk carried by one end of said pivot rod and disposed in front of one of said tractor wheels, a second cultivator disk carried by said pivot rod rearwardly of said tractor wheels in position to throw the dirt on the track of the tractor wheel, a pivoted beam, a flexible connection between said pivot beam and the outer end of the disk carrying means, and manually actuated means for throwing the power of the tractor engine on the pivoted beam to raise the latter, whereby the cultivator disks are raised.

4. The combination with a tractor having drive wheels, of a pivot rod rotatably disposed along the central longitudinal axis of the tractor, a cultivator disk carried by one end of said pivot rod and disposed in front of one of said tractor wheels, a second cultivator disk carried by said pivot rod rearwardly of said tractor wheels in position to throw the dirt on the track of the tractor wheels, a pivoted beam a flexible connection between said pivot beam and the outer end of the disk carrying means, manually actuated means for throwing the power of the tractor engine on the pivoted beam to raise the latter, whereby the cultivator disks are raised, and means for holding the cultivator disks in their raised position.

LEVI C. HESTER.